US012674477B2

(12) United States Patent
Won

(10) Patent No.: US 12,674,477 B2
(45) Date of Patent: Jul. 7, 2026

(54) CYLINDER FAILURE PREDICTION SYSTEM AND METHOD, AND CYLINDER FAILURE INSPECTION SYSTEM AND METHOD

(71) Applicant: LG ENERGY SOLUTION, LTD., Seoul (KR)

(72) Inventor: Young Sik Won, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 705 days.

(21) Appl. No.: 18/024,689

(22) PCT Filed: Jul. 18, 2022

(86) PCT No.: PCT/KR2022/010457
§ 371 (c)(1),
(2) Date: Mar. 3, 2023

(87) PCT Pub. No.: WO2023/008801
PCT Pub. Date: Feb. 2, 2023

(65) Prior Publication Data
US 2024/0011514 A1 Jan. 11, 2024

(30) Foreign Application Priority Data
Jul. 29, 2021 (KR) ........................ 10-2021-0099895

(51) Int. Cl.
*F15B 19/00* (2006.01)
*F15B 15/14* (2006.01)

(52) U.S. Cl.
CPC ............ *F15B 19/005* (2013.01); *F15B 15/14* (2013.01); *F15B 2211/87* (2013.01)

(58) Field of Classification Search
CPC ..................................................... F15B 19/005
See application file for complete search history.

(56) References Cited

U.S. PATENT DOCUMENTS

2006/0021348 A1 2/2006 Neumann et al.
2013/0276516 A1 10/2013 Tabor
(Continued)

FOREIGN PATENT DOCUMENTS

EP 1 508 736 A1 2/2005
JP 2000-250625 A 9/2000
(Continued)

OTHER PUBLICATIONS

International Search Report for PCT/KR2022/010457 mailed on Oct. 21, 2022.
(Continued)

*Primary Examiner* — Paul B Yanchus, III
(74) *Attorney, Agent, or Firm* — Birch, Stewart, Kolasch & Birch, LLP

(57) ABSTRACT

A cylinder failure prediction system includes a data acquisition part configured to acquire a plurality of pieces of operation time data for each of a plurality of cylinders by repeatedly detecting operation times of the plurality of cylinders over an equipment operation elapsed time, a degradation index value calculation part configured to calculate degradation index values of a plurality of statistical degradation indexes that can represent a failure of the cylinder on the basis of the operation time data, and a determination part configured to rank the degradation index values of the statistical degradation indexes calculated for each cylinder according to a magnitude, and assign a predetermined score to each of the cylinders having an upper value, which is greater than or equal to a predetermined range, in the ranked degradation index values and determine a failure-predicted cylinder on the basis of a sum of the predetermined scores.

14 Claims, 13 Drawing Sheets

(56) References Cited

U.S. PATENT DOCUMENTS

| | | | |
|---|---|---|---|
| 2015/0007713 A1 | 1/2015 | Aki | |
| 2020/0232484 A1 | 7/2020 | De Carolis et al. | |
| 2021/0310504 A1* | 10/2021 | Tabor | F15B 19/005 |

FOREIGN PATENT DOCUMENTS

| | | | |
|---|---|---|---|
| JP | 2004-133857 | A | 4/2004 |
| JP | 2007-10106 | A | 1/2007 |
| JP | 2011-230634 | A | 11/2011 |
| JP | 2014-85913 | A | 5/2014 |
| JP | 2015-14990 | A | 1/2015 |
| JP | 5651099 | B2 | 1/2015 |
| JP | 6011875 | B2 | 10/2016 |
| JP | 2020-85551 | A | 6/2020 |
| JP | 2022-49395 | A | 3/2022 |
| KR | 10-1668826 | B1 | 10/2016 |
| KR | 10-2018-0104857 | A | 9/2018 |
| KR | 10-1936283 | B1 | 1/2019 |
| KR | 10-2019-0117032 | A | 10/2019 |
| KR | 10-2253820 | B1 | 5/2021 |

OTHER PUBLICATIONS

Japanese Notice of Allowance for Japanese Application No. 2023-514450, dated Feb. 20, 2024, with English Translation.

* cited by examiner

[FIG. 1] CONVENTIONAL ART
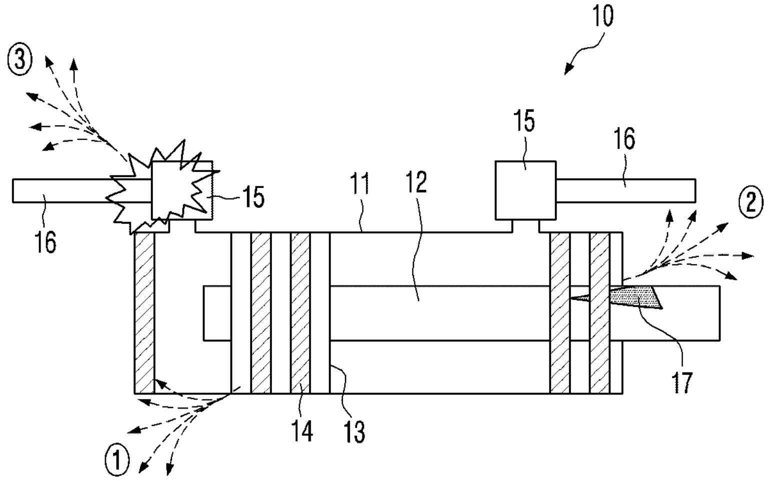

[FIG. 2]
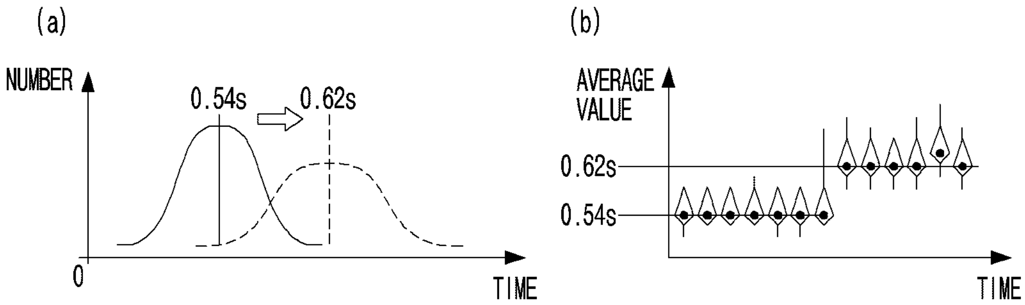

[FIG. 3]
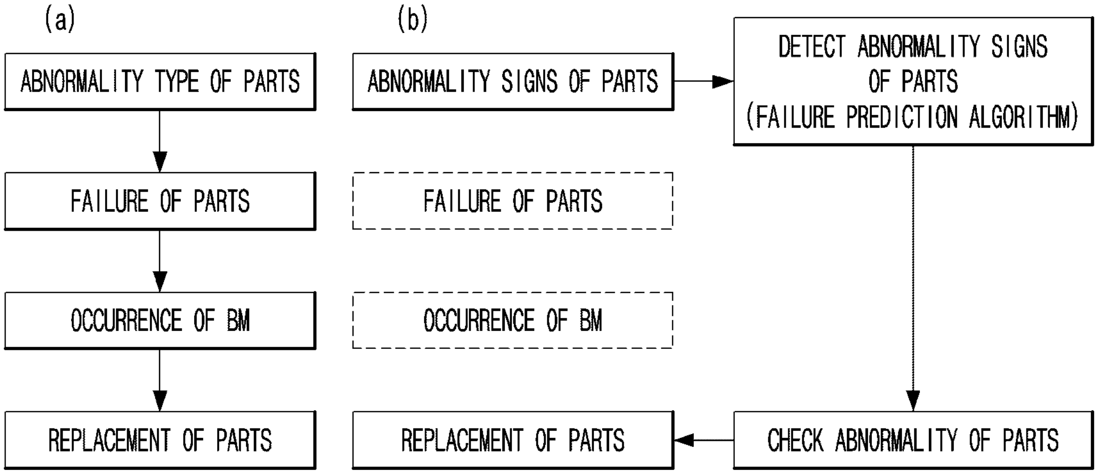

[FIG. 4]
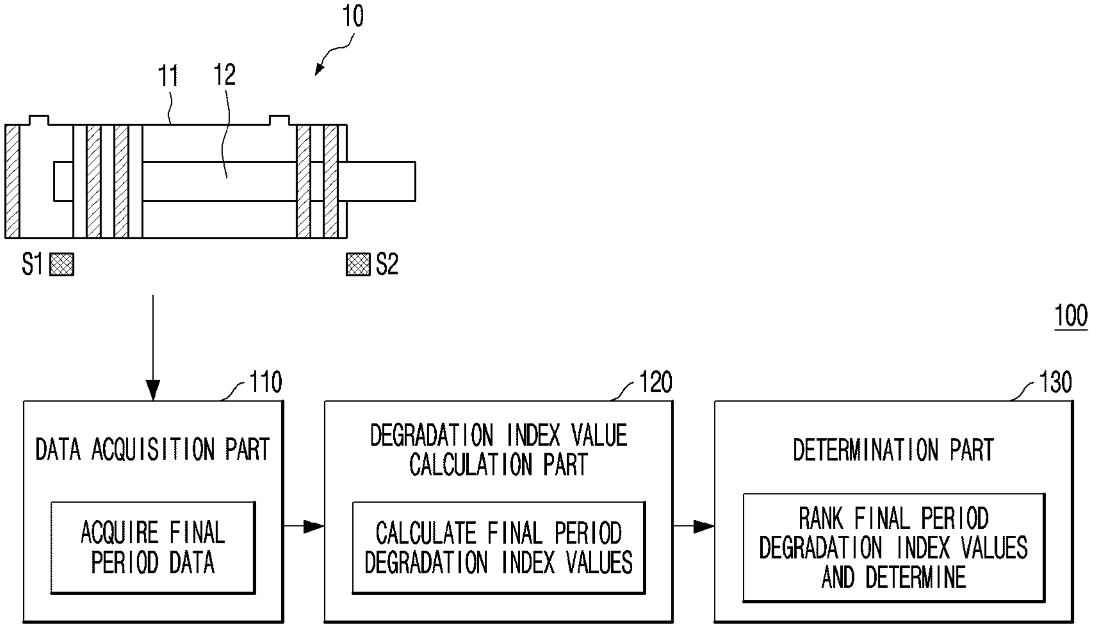

[FIG. 5]
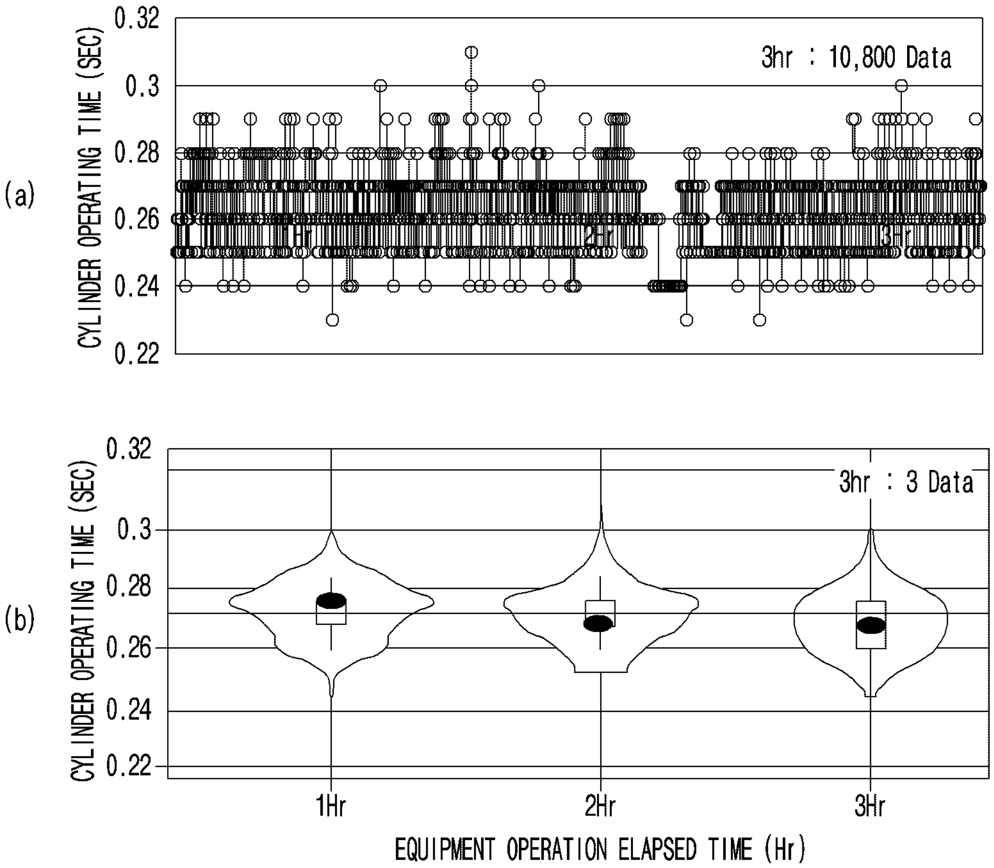

[FIG. 6]
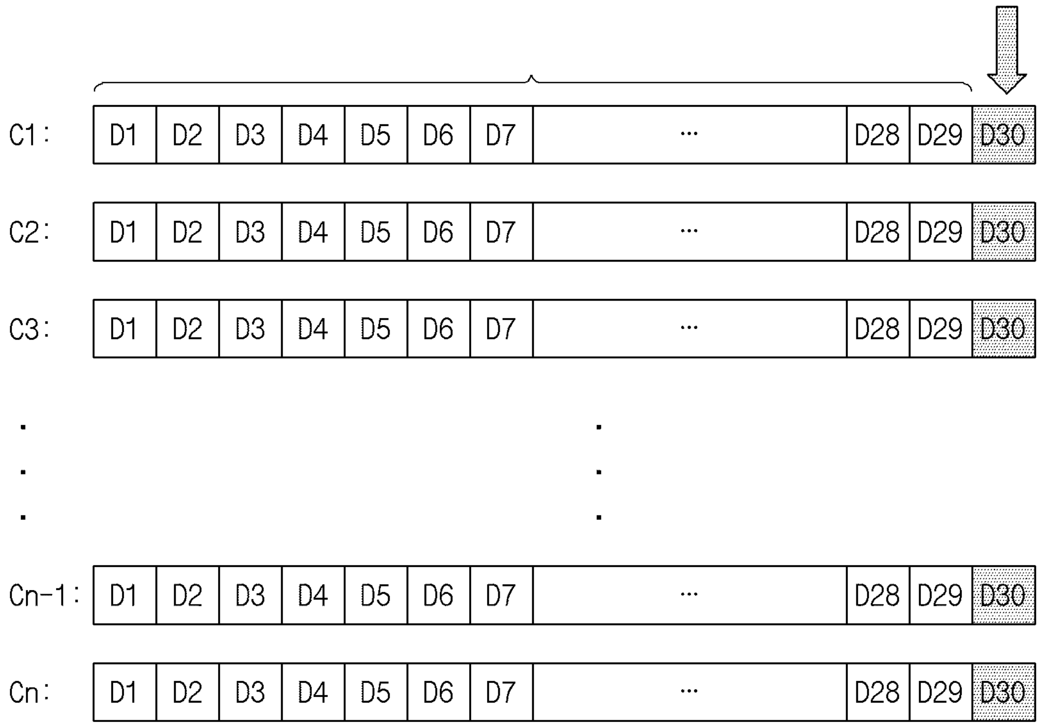
< STATISTICAL DEGRADATION INDEXES: A (AVERAGE) AND B (SKEWNESS) >
< DEGRADATION INDEX VALUES TO BE RANKED: A AND B VALUES OF DATA GROUP D30 OF C1 TO CN >

[FIG. 7]
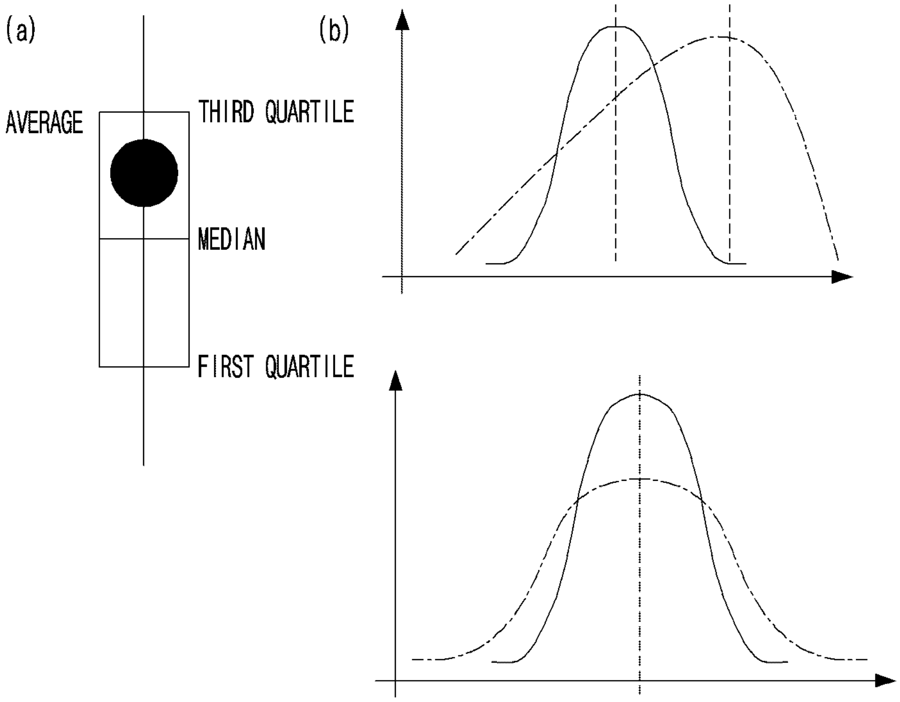

[FIG. 8]
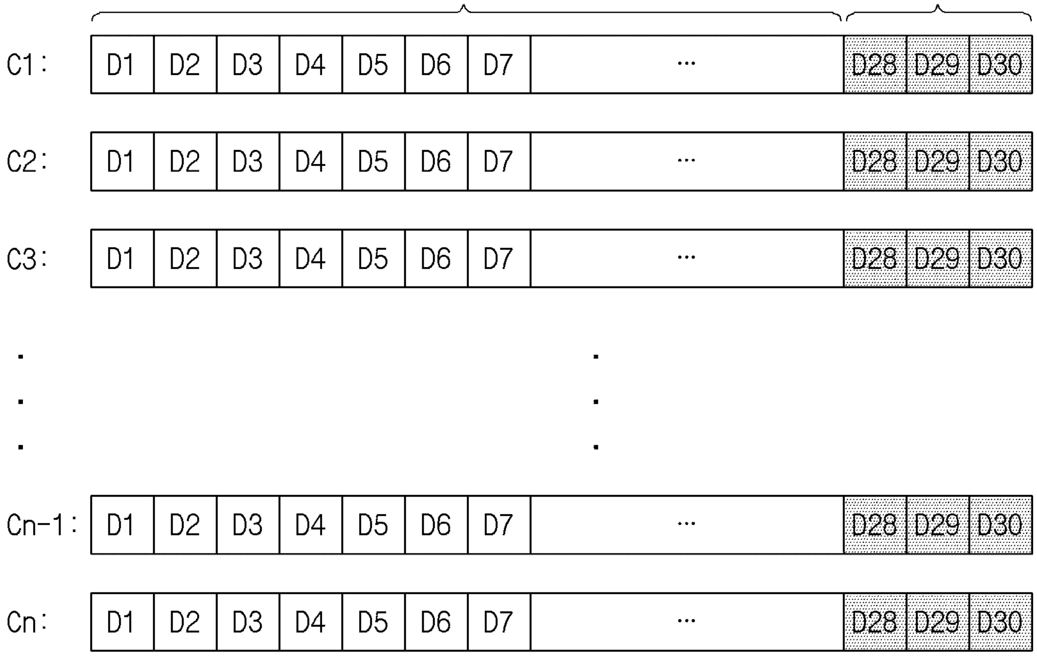
< STATISTICAL DEGRADATION INDEXES: A (AVERAGE) AND B (SKEWNESS) >
< DEGRADATION INDEX VALUES TO BE RANKED: AVERAGE VALUE OF EACH OF A AND B VALUES OF DATA GROUPS D28, D29, AND D30 OF C1 TO CN >

[FIG. 9]
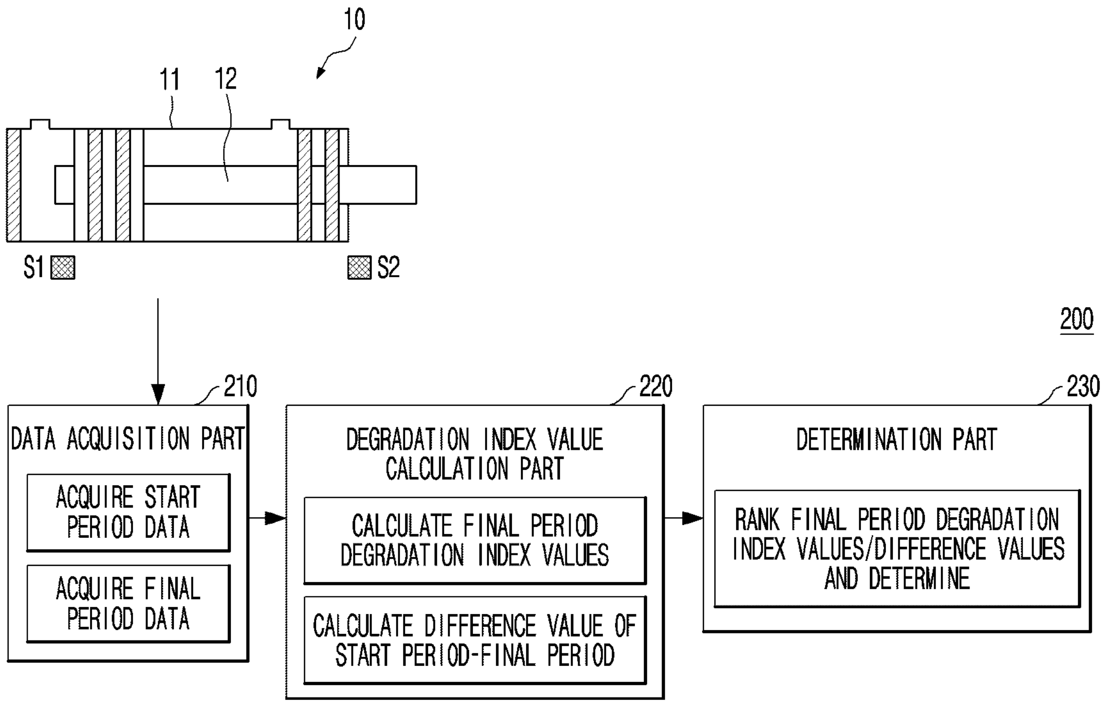

[FIG. 10]
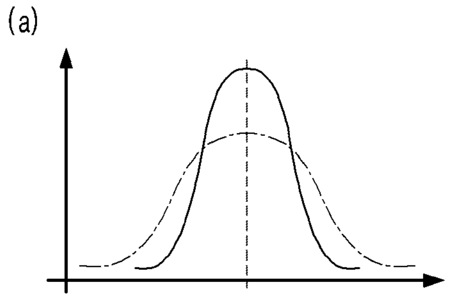

[FIG. 11]
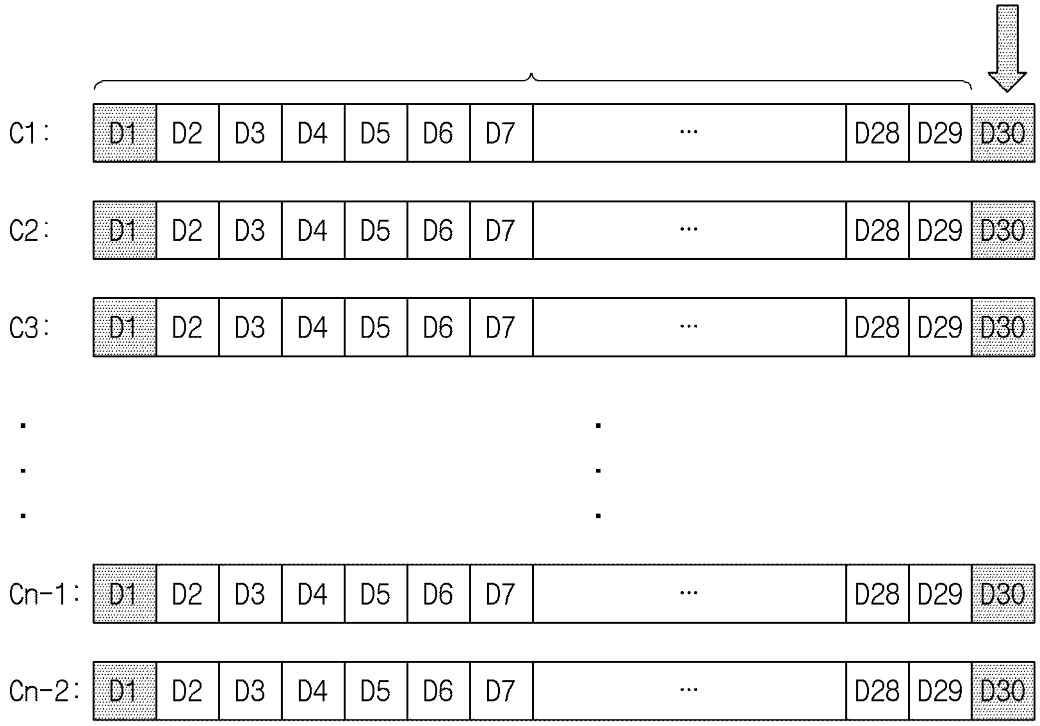
< STATISTICAL DEGRADATION INDEXES: A (AVERAGE) AND B (SKEWNESS), C=|B OF D1-B OF D30| (SKEWNESS CHANGE VALUE=SKEWNESS DIFFERENCE VALUE) >
< DEGRADATION INDEX VALUES TO BE RANKED: A, B, AND C OF DATA GROUP D30 OF C1 TO CN >

[FIG. 12]
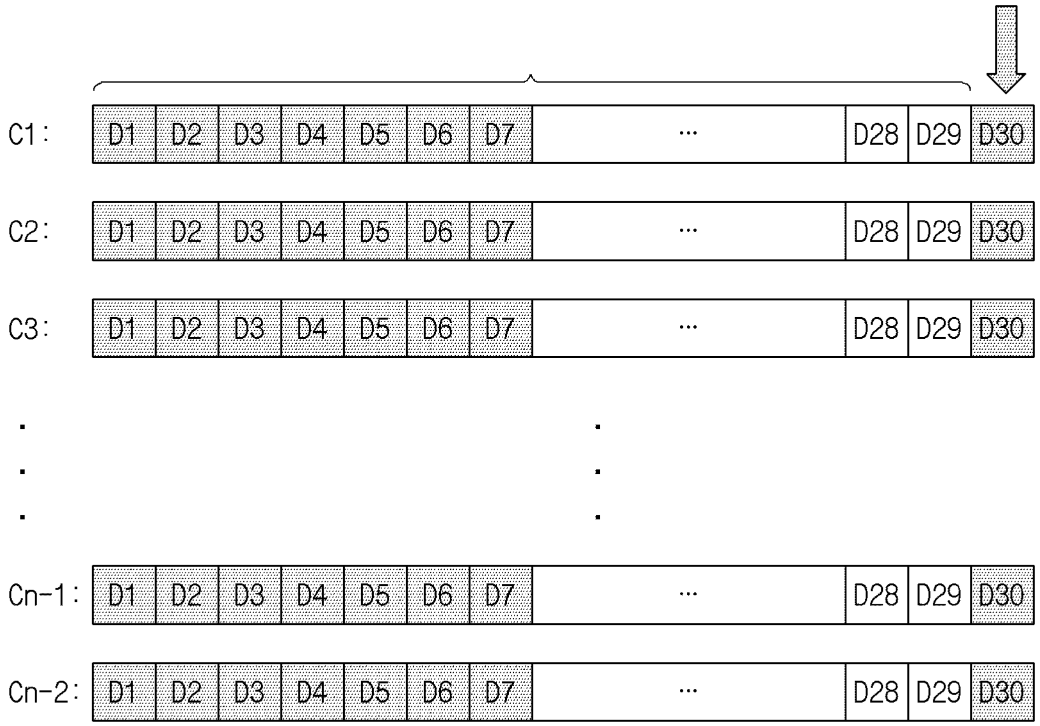
< STATISTICAL DEGRADATION INDEXES: A (AVERAGE) AND B (SKEWNESS), C'=|AVERAGE OF B VALUES OF D1 TO D7-B VALUE OF D30| >
< DEGRADATION INDEX VALUES TO BE RANKED: A, B, AND C OF DATA GROUP D30 OF C1 TO CN >

[FIG. 13]
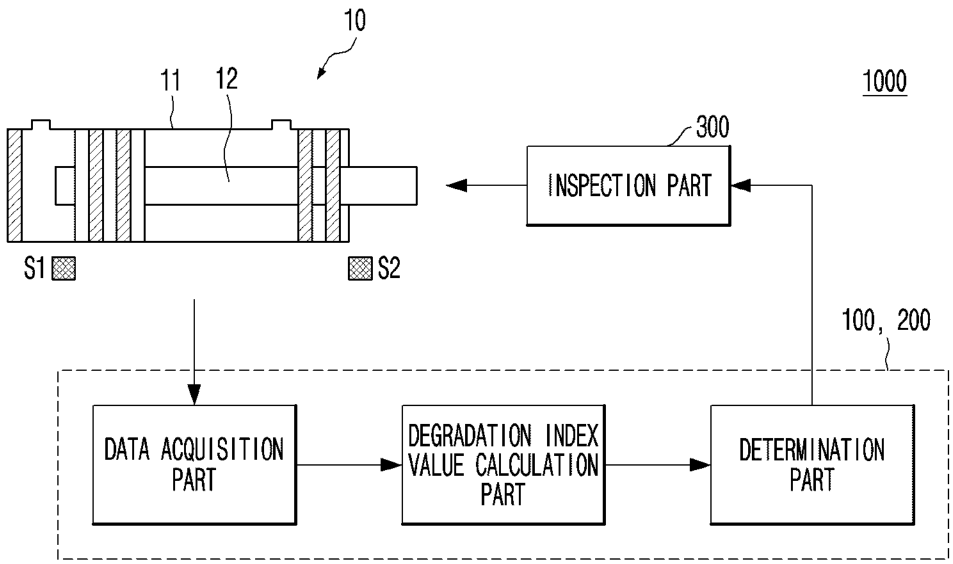

CYLINDER FAILURE PREDICTION SYSTEM AND METHOD, AND CYLINDER FAILURE INSPECTION SYSTEM AND METHOD

TECHNICAL FIELD

The present invention relates to a system and method for predicting the failure of a cylinder.

In addition, the present invention relates to a cylinder failure inspection system and method for inspecting and replacing a cylinder whose failure is predicted by the failure prediction system and method.

This application claims the benefit of priority based on Korean Patent Application No. filed on Jul. 29, 2021, and the entire contents of the Korean patent application are incorporated herein by reference.

BACKGROUND ART

Recently, chargeable and dischargeable secondary batteries are widely used as energy sources of wireless mobile devices. Further, the secondary batteries also attract attention as energy sources for electric vehicles, hybrid electric vehicles, and the like that have been proposed to solve air pollution or the like caused by conventional gasoline vehicles and diesel vehicles that use fossil fuel. Thus, types of applications using the secondary batteries are diversifying due to advantages of the secondary batteries, and it is expected that the secondary batteries will be applied to more fields and products from now in the future.

In order to manufacture the secondary battery, a plurality of detailed processes such as a process of coating an active material on a current collector and rolling the coated current collector to manufacture a positive electrode and a negative electrode, which are components, a notching process of forming an electrode tab, a laminating process of manufacturing an electrode assembly by stacking the positive electrode/a separator/the negative electrode, a welding process of welding the electrode tab and an electrode lead, a process of cutting the electrode assembly for a stack, a charge/discharge process for imparting characteristics before shipping, and the like are performed. In each of the processes, various types of actuators are used to operate materials or each detailed device or another system.

The actuator is a device for driving a movable body of equipment or the like, and more particularly, is configured using a motor, a solenoid, a cylinder, and the like. Among the components of the actuator, the cylinder includes a cylindrical cylinder body and a cylinder rod, which is accommodated in the cylinder body and includes a piston at a front end thereof, and the cylinder rod moves linearly within the cylinder body to give a driving force to the movable body. When there is an abnormality in the operation of the cylinder or the cylinder rod, the movable body may not move according to a set value, which causes abnormalities in the operation of a factory production line and defects in manufactured products. In particular, when a serious cylinder failure occurs, a situation in which some or all of a manufacturing system of a factory are broken down may occur. In order to prevent such breakdown, it is necessary to identify a sign of a failure or abnormality of the cylinder in advance before the cylinder failure occurs.

However, conventionally, the failure of an actuator is diagnosed only by dividing an operation time of the actuator into a plurality of items and analyzing the divided operation times (Patent Document 1), or whether the cylinder is normal is judged only by comparing the operation time with a normal range, and there is no technology that can predict the occurrence of a failure of a cylinder in advance by identifying a sign of the failure before the failure occurred.

PRIOR-ART DOCUMENT

Patent Document

Japanese Patent Application Publication No. 2007-010106.

DISCLOSURE

Technical Problem

The present invention has been devised to solve the above problems, an object of the present invention is to provide a cylinder failure prediction system and method capable of selecting statistical degradation indexes that may represent a failure of a cylinder and predicting whether the failure occurs on the basis of the degradation indexes, before the failure occurs.

Another object of the present invention is to provide a cylinder failure inspection system and method capable of inspecting and replacing the cylinder whose failure is predicted by the failure prediction system and method.

Technical Solution

A cylinder failure prediction system according to the present invention for solving the above problems includes a data acquisition part configured to acquire a plurality of pieces of operation time data for each cylinder of a plurality of cylinders by repeatedly detecting operation times of the plurality of cylinders over an equipment operation elapsed time, a degradation index value calculation part configured to calculate degradation index values of a plurality of statistical degradation indexes capable of representing a failure of each cylinder on the basis of the operation time data, and a determination part configured to rank the degradation index values of the statistical degradation indexes calculated for each cylinder according to a magnitude, assign a predetermined score to cylinders of the plurality cylinders having an upper value, which is greater than or equal to a predetermined range, in the ranked degradation index values, and determine a failure-predicted cylinder on the basis of a sum of the predetermined scores.

As a specific example, the data acquisition part may acquire data by taking one or more of a forward movement time, a backward movement time, and a summed time of the forward and backward movement times of a cylinder rod of each cylinder as an operation time of each cylinder.

As a more specific example, the data acquisition part may consider each of the forward movement time and the backward movement time of the cylinder rod as one piece of separate and independent operation time data, and may acquire two pieces of operation time data corresponding to the forward and backward movement times when the cylinder rod provided in each cylinder performs one reciprocating operation.

As one example, the statistical degradation indexes may include two or more selected from a group consisting of an average, a variance, a first quartile, a median, a third quartile, a skewness, and a kurtosis of the pieces of operation time data of each cylinder.

As another example, one or more selected from a group consisting of an average, a variance, a first quartile, a median, a third quartile, a skewness, and a kurtosis of the pieces of operation time data of each cylinder, and a change value of at least one statistical degradation index selected from the group may be taken as the statistical degradation indexes.

As one example, the degradation index values of the statistical degradation indexes may be calculated on the basis of pieces of operation time data of each cylinder operated during a specific time section after each cylinder is repeatedly used for a predetermined period of time.

As a specific example, the data acquisition part may group the pieces of operation time data of each cylinder for each unit time section of an inspection target period that is composed of a plurality of unit time sections and takes the grouped pieces of operation time data as an individual operation time data group, and the degradation index value calculation part may calculate the degradation index values of each cylinder for each operation time data group.

As one example, the determination part may rank final period degradation index values, which are calculated on the basis of the operation time data group of a specific unit time section after the operation is performed for predetermined unit time sections of the inspection target period, for each cylinder, and assign a predetermined score to cylinders of the plurality of cylinders having an upper value, which is greater than or equal to a predetermined range, in the ranked final period degradation index values, and determine the failure-predicted cylinder on the basis of a sum of the predetermined scores.

As another example, the determination part may rank average final period degradation index values obtained by averaging final period degradation index values, which are calculated on the basis of each of operation time data groups of specific unit time sections after the operation is performed for predetermined unit time sections of the inspection target period, for each cylinder, and assign a predetermined score to cylinders of the plurality of cylinders having an upper value, which is greater than or equal to a predetermined range, in the ranked average final period degradation index values, and determine the failure-predicted cylinder on the basis of a sum of the predetermined scores.

As another example, a difference value obtained by subtracting the final period degradation index value from a start period degradation index value for the operation time data group in the unit time section of a start period of the inspection target period or an average value of the start period degradation index values obtained on the basis of the operation time data groups of the unit time sections of the start period thereof may be provided as an additional statistical degradation index capable of representing the failure of the cylinder.

As still another example, a difference value obtained by subtracting the average final period degradation index values from a start period degradation index value for the operation time data group in the unit time section of a start period of the inspection target period or an average value of the start period degradation index values obtained on the basis of the operation time data groups of the unit time sections of the start period thereof may be provided as an additional statistical degradation index capable of representing the failure of the cylinder.

A cylinder failure inspection system according to another aspect of the present invention includes the cylinder failure prediction system, and an inspection part configured to measure an air leak of a cylinder, which is determined as a failure-predicted cylinder by the determination part.

A cylinder failure prediction method according to still another aspect of the present invention includes acquiring a plurality of pieces of operation time data for each cylinder of a plurality of cylinders by repeatedly detecting operation times of the plurality of cylinders over an equipment operation elapsed time, selecting a plurality of statistical degradation indexes capable of representing a failure of each cylinder and calculating degradation index values of the selected statistical degradation indexes on the basis of the operation time data, ranking each of the degradation index values for each cylinder according to a magnitude, and assigning a predetermined score to cylinders of the plurality of cylinders having an upper value, which is greater than or equal to a predetermined range, in the ranked degradation index values, and determining a failure-predicted cylinder on the basis of a sum of the predetermined scores.

As a specific example, a change value of at least one statistical degradation index selected from among the plurality of statistical degradation indexes may be provided as an additional statistical degradation index for determining the failure-predicted cylinder.

A cylinder failure inspection method according to yet another aspect of the present invention includes inspecting a cylinder that is determined as a failure-predicted cylinder by the cylinder failure prediction method, and replacing the cylinder in which a failure is found by the inspection.

Advantageous Effects

According to the present invention, it is possible to predict the failure of a cylinder before the failure occurs and replace the cylinder, whose failure is expected, in advance, so that a factory, a manufacturing system, or the like can be prevented from breaking down.

Further, according to the present invention, the number of cylinders to be inspected can be significantly reduced, so that manpower, work amount, and work time required for maintenance can be greatly reduced.

BRIEF DESCRIPTION OF THE DRAWINGS

FIG. 1 is a schematic view illustrating a shape of a conventional cylinder and failure occurrence points.

FIG. 2 is a graph illustrating a trend change in an operation time of the cylinder.

FIG. 3 is a block diagram for describing a concept of failure occurrence prediction of the present invention.

FIG. 4 is a schematic view illustrating a cylinder failure prediction system according to one embodiment of the present invention.

FIG. 5 is a graph illustrating a state in which pieces of operation time data of a cylinder are grouped and statistically visualized.

FIG. 6 is a schematic view illustrating a failure prediction mechanism executed by a cylinder failure prediction system according to one embodiment of the present invention.

FIG. 7 is a schematic view illustrating examples of a statistical degradation index based on an operation time of the cylinder.

FIG. 8 is a schematic view illustrating a failure prediction mechanism executed by a cylinder failure prediction system according to a modified example of one embodiment of the present invention.

FIG. 9 is a schematic view illustrating a cylinder failure prediction system according to another embodiment of the present invention.

FIG. 10 is a schematic view illustrating a change of a statistical degradation index.

FIGS. 11 and 12 are schematic views illustrating a failure prediction mechanism executed by the cylinder failure prediction system according to another embodiment of the present invention.

FIG. 13 is a schematic view illustrating a cylinder failure inspection system according to the present invention.

BEST MODE

Hereinafter, the present invention will be described in detail. Prior to this, terms or words used in the present specification and claims should not be restrictively interpreted as ordinary meanings or dictionary-based meanings, but should be interpreted as meanings and concepts consistent with the technical ideas of the present invention on the basis of the principle that an inventor can properly define the concept of a term to describe and explain his or her invention in the best way.

In the present application, it will be further understood that the terms "comprise," "comprising," "include," and/or "including", when used in this specification, specify the presence of stated features, integers, steps, operations, elements, components and/or groups thereof but do not preclude the presence or addition of one or more other features, integers, steps, operations, elements, components and/or groups thereof. In addition, when it is stated that a portion of a layer, film, area, plate, and the like is "on" another portion, this includes the case of the portion "being directly on" the other portion in addition to still another portion being interposed therebetween. In contrast, when it is stated that a portion of a layer, film, area, plate, and the like is "below" another portion, this includes the case of the portion "being directly below" the other portion in addition to still another portion being interposed therebetween. In addition, it may be understood that when it is stated herein that an element is disposed "on" a certain element, this may also include a case in which the element is disposed below the certain element.

FIG. 1 is a schematic view illustrating a shape of a conventional cylinder and failure occurrence points.

As shown in FIG. 1, a conventional cylinder 10 includes a cylinder body (housing) 11 and a cylinder rod 12 configured to reciprocate in the cylinder body 11. The cylinder rod 12 includes a piston 13 at a front end thereof. Main causes of cylinder failure may be divided into ① a leak due to degradation of a packing 14 inside the cylinder, ② a leak due to friction or grinding of the cylinder rod 12 and the housing 11, ③ an abnormality in a connection of a hose 16 due to cracking/loosening of a fitting portion 15, and the like. In FIG. 1, reference numeral 17 denotes a friction or grinding portion 17 of the cylinder rod 12 and the housing 11. When a leak or the like occurs in the cylinder 10, hydraulic or pneumatic pressure must additionally be supplied to achieve the same movement stroke of the cylinder rod 12. Thus, a movement of the cylinder rod is delayed until the additional hydraulic/pneumatic pressure is supplied. That is, operational degradation of the cylinder and the cylinder rod may be expressed as an operation time delay of the cylinder rod.

FIG. 2 is a graph illustrating a trend change in an operation time of the cylinder.

FIG. 2 illustrates a trend in which an operation time of a cylinder repeatedly used in a secondary battery manufacturing process changes according to an increase in the number of operations. As shown in the drawing, it can be seen that the operation time of the cylinder gradually increases according to the number of operations, and specifically, an average value of the operation times of the cylinder increases from 0.54 seconds to 0.62 seconds. As described above, the operation time of the cylinder is closely related to the operational degradation of the cylinder. In the present invention, the operation time of the cylinder is selected as a factor that may represent the cylinder failure, and, as will be described below, statistical degradation indexes and values of the degradation indexes are calculated on the basis of data on the operation time of the cylinder, and a failure-predicted cylinder is predicted using the degradation index values. Since the statistical degradation index is based on the operation time data that may represent the cylinder failure, the statistical degradation index may also represent the cylinder failure.

FIG. 3 is a block diagram for describing a concept of failure occurrence prediction of the present invention.

As shown in (a) of FIG. 3, parts of the cylinder show signs of abnormality before a failure occurs. When the failure of the part is not predicted from the abnormal sign, the failure eventually occurs, and in this case, a situation in which some or all of a manufacturing system of a factory are broken down (BM) may occur. When the part is replaced after the breakdown occurs, this is very uneconomical and reduces manufacturing efficiency.

On the other hand, as shown in (b) of FIG. 3, according to the present invention, when an abnormal sign occurs in the cylinder part, the abnormal sign may be detected in advance by a cylinder failure prediction system or a cylinder failure prediction method using a cylinder failure prediction algorithm unique to the present invention. That is, since the failure of the cylinder may be predicted in advance before the failure occurs, it is possible to check whether there is any abnormality in the cylinder part and replace the malfunctioning part, so that the system breakdown that may occur in the related art may be prevented. The technical idea of the present invention is not to diagnose the failure of the cylinder or analyze a cause of the failure, but to predict in advance a cylinder, which is expected to fail or has a high probability of failure, before the failure occurs. Thus, even when the cylinder is a normal cylinder that is not currently faulty, the cylinder may be determined as a failure-predicted cylinder. In this regard, there is a difference from the related art in which a failure is diagnosed or only whether a cylinder is normal or not is determined.

Hereinafter, the present invention will be described in detail.

First Embodiment

FIG. 4 is a schematic view illustrating a cylinder failure prediction system according to one embodiment of the present invention.

A cylinder failure inspection system 100 according to the present invention includes a data acquisition part 110 configured to acquire a plurality of pieces of operation time data for each cylinder by repeatedly detecting operation times of a plurality of cylinders 10 over an equipment operation elapsed time, a degradation index value calculation part 120 configured to calculate degradation index values of statistical degradation indexes that may represent a failure of the cylinder on the basis of the operation time data, and a determination part 130 configured to rank the degradation index values calculated for each cylinder according to a magnitude and determine a cylinder having an upper value, which is greater than or equal to a predetermined range, in the ranked degradation index values as a failure-predicted cylinder.

The operation time of the cylinder described in the present invention includes one or more of a forward movement time, a backward movement time, and a summed time of the forward and backward movement times of the cylinder rod 12. As shown in FIG. 1, when the operation of the cylinder 10 is degraded, not only each of the forward and backward movement times of the cylinder rod 12 but also the summed time of the forward and backward movement times are delayed. Thus, not only each of the forward and backward movement times, but also the summed time of the forward and backward movement times or a combination of the forward movement time or the backward movement time and the summed time may all be regarded as the operation time data that is the basis for calculating the degradation index values. In the present embodiment, for convenience of calculation, each of the forward and backward movement times of the cylinder rod is considered as one piece of separate and independent operation time data. That is, since the forward and backward movement times of the cylinder are generally similar to each other, each of the forward and backward movement times, which is acquired when the cylinder rod 12 reciprocally operates once, is regarded as separate data. Accordingly, two pieces of operation time data may be acquired during one reciprocating operation of the cylinder rod. For example, when there are 50 failure-prediction target cylinders, 100 pieces of operation time data may be acquired during the reciprocating operation of the cylinder rod of each cylinder. That is, in the present embodiment, the failure-predicted cylinder is determined by considering each of the forward and backward movement times as one piece of statistical data. Of course, the failure may be predicted by acquiring only the forward movement time or only the backward movement time as the operation time data. However, when all of the data of both cases are acquired, data covering the entire reciprocating operation of the cylinder rod may be included, and accordingly, there is an advantage in that the determination of the cylinder failure may be performed more precisely and the predictability of the failure may be further improved.

As shown in FIG. 4, the acquisition of the operation time data may be detected, for example, by sensors S1 and S2 respectively installed at an ending end portion and a starting end portion of the housing 11 in which the cylinder rod 12 reciprocates. The sensor S1 installed at the ending end portion detects that the cylinder rod 12 reaches a forward movement end. The sensor S2 installed at the starting end portion detects that the cylinder rod 12 reaches a backward movement end. The sensors may be installed inside or outside the cylinder. The sensor may be, for example, a limit switch that indicates a position of the piston at the front end of the cylinder rod by ON/OFF of the switch.

The data acquisition part 110 may acquire a time interval, at which each of sensed values of the sensors S1 and S2 is received, as the operation time data of the forward or backward movement time of the cylinder. The cylinder reciprocally operates many times over the equipment operation elapsed time, and thus the forward movement time and operation time data corresponding to the reciprocating number may be acquired for one cylinder. In the present invention, the operation time of each cylinder is compared to determine the failure-predicted cylinder, and thus, a plurality of pieces of operation time data are acquired for each cylinder. To this end, the data acquisition part 110 may include a data collection device and a database configured to store the data.

The plurality of pieces of operation time data are acquired over the equipment operation elapsed time for each cylinder. For example, when one cylinder reciprocates 1,800 times, 3,600 pieces of operation time data may be acquired for one hour, and 10,800 pieces of operation time data may be acquired for three hours, and 86,400 pieces of operation time data may be acquired when 24 hours have passed. In addition, when the cylinder repeatedly operates over 30 days, 86,400×30 pieces of operation time data may be acquired. When a statistical index is calculated using such a large amount of data at one time, the amount of data to be processed becomes extremely large. In this case, a large load is placed on an algorithm or program for predicting a failure, and thus the failure may not be determined quickly. Furthermore, when the number of failure-prediction target cylinders is increased, the above-described problem becomes more severe because the amount of data throughput is further increased.

Thus, when data for failure prediction is acquired and a degradation index value is calculated using the data, a so-called grouping technique is used. Grouping is one of statistical techniques for reducing the number of pieces of data, and refers to a technique to reduce the amount of data to be processed by grouping pieces of data according to a subject, a period, or a characteristic and considering the grouped data as one data (group).

FIG. 5 is a graph illustrating a state in which the pieces of operation time data of the cylinder are grouped and statistically visualized. Referring to (a) of FIG. 5, the number of pieces of operation time data of the cylinder is 3,600 per one hour and is 10,800 when the cylinder operates for three hours, but when the pieces of operation time data are grouped as shown in (b) of FIG. 5, the pieces of operation time data may be grouped into three data groups. When all pieces of data related to the operation time of the cylinder are represented as shown (a) of FIG. 5, data trends may not be clearly identified, but when the pieces of data are grouped and visually represented as shown in (b) of FIG. 5, there is an advantage that a change of the operation time data according to time may be identified at a glance. In addition, when statistical indexes, for example, an average, a variance, and the like are calculated on the basis of the total data number as shown in (a) of FIG. 5, the amount of data throughput and the amount of computation are increased, as described above. However, as shown in (b) of FIG. 5, when the statistical indexes, such as the variance, are calculated for each data group for each time and variance values of three data groups are averaged, a variance value corresponding to the total data number may be obtained while significantly reducing data throughput.

In FIG. 5, one hour is taken as a unit time, and operation time data acquired for one hour is taken as one data group. However, the unit time used to acquire the grouped data group may be set as three hours, eight hours, 24 hours, or more. For example, a plurality of 24 hours may be defined as one unit time section, and the operation time data of the cylinder operated for each unit time section may be grouped to be one data group. In this case, one data group is a group of the pieces of operation time data of one cylinder which is repeatedly operated over an equipment operation elapsed time of 24 hours. In this manner, a plurality of data groups may be obtained over a specific inspection target period, such as one week, several weeks, or a month. For example, when data groups are acquired by taking one day (24 hours) as a unit time section to predict failures of the cylinders operated for 30 days in the factory, the data acquisition part may acquire 30 data groups for each cylinder.

FIG. 6 is a schematic view illustrating a failure prediction mechanism executed by a cylinder failure prediction system 100 according to one embodiment of the present invention.

The above drawing illustrates the acquisition of an operation time data group for a total of n cylinders (C1 to Cn) when an inspection target period is set to 30 days. That is, this case shows that the pieces of operation time data of each cylinder are grouped for each unit time section to acquire the operation time data group when one day (24 hours) is taken as the unit time section and the inspection target period (30 days) is composed of 30 unit time sections. Accordingly, 30 operation time data groups are acquired for each individual cylinder such as C1, and the data groups are collected and stored in the data acquisition part.

Referring to FIG. 4 again, the cylinder failure prediction system 100 according to the present invention includes the degradation index value calculation part 120 configured to calculate degradation index values of a plurality of statistical degradation indexes, which may represent the failure of the cylinder, on the basis of the operation time data.

The statistical degradation indexes may include an average, a variance, a skewness, a kurtosis, a first quartile, a median, a third quartile, and the like of the pieces of operation time data of each cylinder, but the present invention is not limited thereto. Even when the plurality of cylinders operate for the same time, the cylinder showing a sign of the failure tends to occur differently due to various causes. The cylinder that is relatively degraded may be selected by measuring the above-described statistical degradation index for the cylinders. That is, in the present invention, the performance or operation time of an individual cylinder is not absolutely compared, but the cylinder that is predicted to have a failure is determined as a failure-predicted cylinder by comparing the operation time data of each cylinder and the statistical degradation indexes based on the operation time data. For example, when an operation time of a specific cylinder is greater than the average, the possibility that the performance of the cylinder is degraded and thus the cylinder is determined as the failure-predicted cylinder is increased. When the specific cylinder is different from other cylinders in other statistical degradation indexes, such as the variance, the skewness, the kurtosis, and the like of the pieces of operation time data, the probability of being determined as the failure-predicted cylinder is also increased.

Among the above-described statistical degradation indexes, the variance is a characteristic value indicating a distribution of data. The first quartile refers to a value that is at a ¼ position from the lowermost portion when pieces of data are sorted from the lowest value to the highest value and then divided into 4 equal parts. The median and the third quartile respectively refer to values that are at ½ and ¾ positions form the lowermost portion when pieces of data are sorted from the lowest value to the highest value and then divided into 4 equal parts.

FIG. 7 is a schematic view illustrating examples of a statistical degradation index based on an operation time of the cylinder. In (a) of FIG. 7, a relationship between the above-described third quartile, a median, first quartile, and average is well illustrated. As shown in an upper graph in (b) of FIG. 7, the skewness is an index indicating the asymmetry of data on the basis of a normal distribution curve, and as shown in a lower graph in (b) of FIG. 7, the kurtosis is an index indicating the height of data on the basis of the normal distribution curve. The above-described statistical degradation indexes may be quantified and calculated as the degradation index values by a predetermined computing program on the basis of the operation time data of each cylinder. Since the operation time of the cylinder is a factor that may reflect or represent the degradation or failure of the cylinder or the sign of the failure of the cylinder, the statistical degradation indexes calculated on the basis of the operation time may also represent the cylinder failure. The degradation index value calculation part of the present invention includes a predetermined computing program, and thus may calculate the degradation index values of the statistical degradation indexes of the individual cylinder for each operation time data group of each unit time section, as shown in FIG. 6.

Meanwhile, in the present invention, the failure-predicted cylinder is determined using at least a plurality of statistical degradation indexes. Even when there are a large number of pieces of data that are the basis for determining a failure, when the failure is determined by comparing one statistical degradation index between cylinders, a failure prediction probability is inevitably lowered. Accordingly, two or more of a plurality of statistical degradation indexes among the statistical degradation indexes based on the operation time data are selected to calculate the degradation index values. When the statistical degradation indexes are selected, it is preferable to select the indexes having different statistical characteristics. For example, when one or more are selected from among the indexes indicating a quantitative change of data, such as, the average, the variance, the first quartile, the median, the third quartile, and the like, and one or more are selected from among the indexes indicating the asymmetry or a change trend of data, such as, the skewness, the kurtosis, and the like, the accuracy of the failure occurrence prediction may be further increased.

Referring to FIG. 4 again, the present invention includes the determination part 130 configured to determine a failure-predicted cylinder on the basis of the degradation index values of the statistical degradation indexes. In order to relatively compare the plurality of cylinders, the determination part 130 ranks the degradation index values of the statistical degradation indexes, which are calculated for each cylinder, according to the magnitude of the degradation index value. In addition, a predetermined score is assigned to the cylinders having an upper value, which is greater than or equal to a predetermined range, in the ranked degradation index values, and the failure-predicted cylinder is determined on the basis of a sum of the predetermined scores.

For example, average and skewness values of pieces of operation time data of a plurality of target cylinders operated over the same equipment operation elapsed time may be obtained for each cylinder, and ranking may be given. In the ranking, a score of, for example, one point is assigned for each of the average and skewness values of the cylinder having an upper value, and the cylinder to which the score is assigned for both the average and skewness values, that is, the cylinder to which the score of two points is assigned may be determined as the failure-predicted cylinder. However, this is merely one example, and specific determination conditions such as a type of the selected statistical degradation index, a criterion for selecting the upper value, and a size of the score may be variously selected and determined in consideration of various causes such as characteristics of the cylinder being evaluated, equipment operating conditions, and factory operating conditions. That is, the detailed failure prediction algorithm executed by the determination part may be adjusted as necessary.

Referring to FIG. 6 again, the determination part 130 may determine the failure-predicted cylinder on the basis of the statistical degradation index of each of 30 operation time data groups acquired for each of a plurality of n cylinders of C1 to Cn. At this point, the degradation index values of the statistical degradation indexes calculated using all pieces of operation time data of the entire 30 days, which is the inspection target period, of each cylinder are ranked, and a predetermined score is assigned to determine the failure-predicted cylinder.

However, in this case, as described above, the amount of data to be processed is exponentially increased, and thus the system may be overloaded and it is difficult to calculate quickly. In addition, comparing the pieces of operation time data of the entire 30 days for each cylinder may not only be inefficient, but also reduce the reliability of the failure prediction. That is, the failure of the cylinder usually occurs after repeated use for a predetermined period of time. Accordingly, determining the failure-predicted cylinder using the degradation index value, which is calculated on the basis of the operation time data group belonging to the unit time section of a start period of the inspection target period, is inefficient in that the probability of the failure is not high. It is reasonable to determine the failure-predicted cylinder on the basis of the pieces of operation time data of each cylinder operated during a specific (unit) time section after being operated by as much as at least a predetermined period of time or predetermined unit time sections. That is, as shown in FIG. 6, the failure-predicted cylinder may be determined on the basis of the operation time data of the cylinder operated, for example, for one day on a 30th day after being operated for 29 days, In this case, since all the cylinders have been used during the same period (29 days), a degradation tendency of each cylinder becomes clear, and thus, when the degradation index value (hereinafter, referred to as a final period degradation index value) calculated for one day on the 30th day, which is a final period, is compared, a degree of the degradation or the possibility of the failure of each cylinder may be clearly identified. In such an aspect, as shown in FIG. 4, the data acquisition part 110 of the cylinder failure prediction system 100 of the present embodiment needs to acquire data at the final period after using at least a predetermined period of time in the plurality of unit time sections, the degradation index value calculation part 120 also calculates the final period degradation index value on the basis of data (group) of the final period, and the determination part 130 also ranks the final period degradation index values for each cylinder to determine the failure-predicted cylinder. However, in the present invention, the terms ‘final period’ and ‘final period degradation index value’ are not limited to a final unit time section (e.g., the unit time section on the 30th day in FIG. 6) after being repeatedly used for a predetermined period of time or the degradation index value calculated on the basis of an operation time data group D30 of the unit time section. Referring to FIG. 6, for example, the degradation index value may be calculated on the basis of one of operation time data groups D28, D29, and D30 after the cylinder is operated for 27 days. In this case, any one selected from the 28th, 29th, and 30th days may be the final period, and a degradation index value calculated on the basis of the data group of the selected final period may be the final period degradation index value. That is, the final period referred to in the present embodiment is sufficient as long as it is a specific time section or a specific unit time section after the cylinder is used (operated) for a predetermined period of time or predetermined unit time sections, and does not necessarily refer to the final unit time section immediately after the cylinder is used for a predetermined period of time. In addition, the term “predetermined period of time” used herein may also be freely selected according to the purpose of inspection or failure prediction, or cylinder characteristics. In FIG. 6, it is assumed that the cylinder is operated for 29 days, but the failure of the cylinder after being used for a longer or shorter period may also be predicted Further, the final period does not necessarily mean only a single unit time section.

FIG. 8 is a schematic view illustrating a failure prediction mechanism executed by a cylinder failure prediction system according to a modified example of one embodiment of the present invention. Referring to FIG. 8, final period degradation index values, which are calculated on the basis of an operation time data group of each of D28, D29, and D30 respectively on 28th, 29th, and 30th days after the cylinder is operated for 27 days, are averaged, and the average final period degradation index values may be adopted as degradation index values for determining a failure-predicted cylinder. Accordingly, in the example of FIG. 8, strictly speaking, the final period is three days, and the degradation index values for the failure prediction are the average final period degradation index values obtained by averaging degradation index values each calculated on the basis of each operation time data group for the three days. It may be more advantageous in terms of the reliability of statistical or mathematical data to predict a failure with the average final period degradation index values calculated on the basis of a plurality of unit time sections or operation time data groups than to predict the failure with the final period degradation index values calculated on the basis of the single unit time section or the single operation time data group as shown in FIG. 6.

Referring to FIG. 6 again, a process of selecting an average A and a skewness B as statistical degradation indexes, and obtaining degradation index values of average and skewness values for each cylinder, for the operation time data group acquired on the basis of the cylinder operation time data on the 30th day after the cylinder is used (operated) for 29 days, is illustrated. At this point, D30 is the operation time data group of the cylinder that is operated for 24 hours on the 30th day and is obtained by grouping 86,400 pieces of data as described above. The average and skewness values may each be obtained on the basis of the operation time data group of D30 for each cylinder and ranked.

Referring to FIG. 8 again, a process of selecting an average A and a skewness B as the statistical degradation indexes on the basis of the operation time data groups D28, D29, and D30, which are acquired on the basis of the cylinder operation time data on the 28th to days after the cylinder is used (operated) for 27 days, and obtaining the average final period degradation index values obtained by averaging again the average values and the skewness values calculated for each operation time data group for each cylinder is illustrated. The average final period degradation index values are ranked for each cylinder, and a predetermined score is assigned to the cylinders having an upper value, which is greater than or equal to a predetermined range, in the average final period degradation index values, and the failure-predicted cylinder may be determined on the basis of a sum of the predetermined scores.

A specific example of determining the failure-predicted cylinder on the basis of the failure prediction mechanism of FIGS. 4 and 6 will be described.

Table 1 below illustrates that six of a skewness, a kurtosis, an average, a first quartile, a third quartile, and a variance are adopted as statistical degradation indexes, and final period degradation index values of 130 cylinders, which are operated for 29 days, on a 30th day are calculated and ranked. However, in the present example, each of the forward and backward movement times of the cylinder is regarded as separate and independent operation time data, and thus two pieces of operation time data of the forward and backward movement times are acquired during one reciprocating operation of the cylinder rod, and the degradation index values are calculated on the basis of the data. Thus, the actual number of cylinders operated for 30 days is 65.

Table 2 illustrates that a score of one point is assigned to the cylinders that are within the top 16% (20 places) in the ranked final period degradation index values.

TABLE 1

Ranking degradation index values

| | Cylinder 1 | Cylinder 2 | Cylinder 3 | . . . | Cylinder 129 | Cylinder 130 |
|---|---|---|---|---|---|---|
| Skewness | 1 | 100 | 109 | . . . | 2 | 37 |
| Kurtosis | 3 | 70 | 11 | . . . | 20 | 6 |
| Average | 79 | 56 | 10 | . . . | 68 | 84 |
| First quartile | 122 | 3 | 21 | . . . | 51 | 83 |
| Third quartile | 15 | 81 | 9 | . . . | 17 | 125 |
| Variance | 99 | 24 | 27 | . . . | 5 | 27 |

TABLE 2

Assigning score at upper value

| | Cylinder 1 | Cylinder 2 | Cylinder 3 | . . . | Cylinder 129 | Cylinder 130 |
|---|---|---|---|---|---|---|
| Skewness | 1 | 0 | 0 | . . . | 1 | 0 |
| Kurtosis | 1 | 0 | 1 | . . . | 1 | 1 |
| Average | 0 | 0 | 1 | . . . | 0 | 0 |
| First quartile | 0 | 1 | 0 | . . . | 0 | 0 |
| Third quartile | 1 | 0 | 1 | . . . | 1 | 0 |
| Variance | 0 | 0 | 0 | . . . | 1 | 0 |

In Table 2, the cylinder for which a sum of the scores is greater than or equal to three points is determined as the failure-predicted cylinder. In this case, the cylinders 1, 3, and 129 are determined as the failure-predicted cylinders. Thus, the above cylinders are likely to fail and need to be checked.

In the above example, a score of one point is assigned for the top 16%, and the cylinder whose total score is greater than or equal to a total of three points is determined as the failure-predicted cylinder. However, a % value of the upper value, the score to be assigned, and a sum of the scores, which is used as a criterion for determining the failure-predicted cylinder, may be changed. Thus, even when a failure of the cylinder is predicted by the failure prediction system of the present invention, a plurality of failure prediction algorithms in various cases may be derived. An important point is that, according to the present invention, a plurality of statistical degradation indexes are selected on the basis of a plurality of pieces of operation time data, degradation index values are derived from the plurality of statistical degradation indexes, the degradation index values are ranked, and a failure-predicted cylinder is determined with a sum of predetermined scores. Thus, in order to increase statistical reliability, a detailed failure prediction algorithm may be changed as necessary as long as it is within the scope of the failure prediction system or method, Second Embodiment FIG. 9 is a schematic view illustrating a cylinder failure prediction system 200 according to another embodiment of the present invention.

The present embodiment is different from the first embodiment in that, in addition to individual statistical indexes such as the average, the skewness, and the kurtosis, which are provided as the statistical degradation indexes, for example, a change value of the average and a change value of the skewness or kurtosis are introduced as additional statistical degradation indexes.

That is, in addition to an average value among the degradation index values for determining a failure-predicted cylinder, how much the average changed or how much the degradation indexes of the skewness and the kurtosis changed is also closely related to the operational degradation of the cylinder. Thus, when a change value of the statistical degradation index is taken as a new statistical degradation index, and the degradation index value is obtained together with the existing statistical degradation index, the reliability of failure prediction may be further increased.

FIG. 10 is a schematic view illustrating the change of the statistical degradation in which (a) of FIG. 10 illustrates that the skewness changes and (b) of FIG. 10 illustrates that the kurtosis changes. In the present embodiment, when a plurality of statistical degradation indexes is selected for predicting a failure, one or more (e.g., the average) may be selected from the conventional statistical degradation indexes, and one or more (e.g., a skewness change value) may be selected from the change values of the statistical degradation indexes as a new statistical degradation index.

In order to add the change value of the statistical degradation index as the new statistical degradation index, values before and after the change of the degradation index should be obtained. To this end, a data acquisition part 210 of the failure prediction system 200 of the present embodiment needs to acquire at least start period operation time data and final period operation time data for each cylinder.

FIGS. 11 and 12 are schematic views illustrating a failure prediction mechanism executed by the cylinder failure prediction system according to the embodiment of FIG. 9.

As shown in FIG. 11, statistical degradation indexes of, for example, the average and the skewness are selected on the basis of an operation time data group D1 of a 1st day, which is a start period of an inspection target period of 30 days, and degradation index values thereof may be calculated. In addition, statistical degradation indexes of, e.g., an average A and a skewness B may be selected on the basis of an operation time data group D30 of a final period that is a 30th day after the cylinder is used for 29 days, and degradation index values thereof may be calculated. In addition thereto, each of a skewness value based on the data group D1 and a skewness value based on the data group D30 is obtained, and a difference thereof is taken as a skewness change value C, and the skewness change value C1 may be used as the new statistical degradation index together with the degradation indexes of the average and the skewness.

That is, referring to FIGS. 9 and 11, three parameters of the average A and the skewness B of the 30th day that is the final period, and the skewness change value C, which is the difference in skewness value between the 1st and 30th days, are taken as degradation index values, and a degradation index value calculation part 220 calculates the degradation index values. A determination part 230 may rank the three degradation index values, assign a predetermined score to the cylinders having an upper value, which is greater than or equal to a predetermined range, in the ranked values, and determine the failure-predicted cylinder on the basis of a sum of the predetermined scores.

Meanwhile, a start period data group, which is the basis for calculating the change value of the statistical degradation index, or start period statistical degradation index values calculated on the basis of the start period data group are not limited to a single unit time section or a start period statistical degradation index value based on the single unit time section.

Referring to FIG. 12, operation time data groups D1 to D7 of seven unit time sections for one week, for example, from 1st day to 7th day, may be taken as basis data for calculating the start period degradation index values. In this case, a degradation index value (e.g., the average or the skewness) is obtained for each of the data groups D1 to D7, and an average value of start period degradation index values, each of which is obtained by averaging the degradation index values, is taken as the start period degradation index value. In addition, a final period degradation index value (the average A and the skewness B) on the 30th day after 29 days of use is obtained, and a difference value (e.g., a change value of the average or a change value C' of the skewness) obtained by subtracting the final period degradation index value from the average value of the start period degradation index values may be introduced as the additional statistical degradation index. Further, in this case, like in FIG. 8, the final period degradation index value, which becomes a criterion for obtaining the difference value, may also adopt average final period degradation index values based on a plurality of operation time data groups of a plurality of unit time sections, as well as those based on a single unit time section. Thus, a difference value obtained by subtracting the final period degradation index value or the average final period degradation index value from the start period degradation index value for an operation time data group in the unit time section of the start period of the inspection target period or the average value of the start period degradation index values obtained on the basis of the operation time data groups of the start period unit time sections may be introduced as the additional statistical degradation index that may represent the failure of the cylinder.

A specific example of determining the failure-predicted cylinder on the basis of the failure prediction mechanism of FIGS. 9 and 12 will be described.

Similar to one example in the first embodiment, six of a skewness, a kurtosis, an average, a first quartile, a third quartile, and a variance are adopted as statistical degradation indexes, and final period degradation index values of 130 cylinders, which are operated for 29 days, at a 30th day are calculated and ranked. Data is acquired by considering forward and backward movement times of the cylinder as separate and independent operation time data as in the example of the first embodiment.

Meanwhile, in the present example, values respectively obtained by averaging skewnesses, kurtosises, and averages of unit time sections for a start period of 7 days are calculated as start period skewness, kurtosis, and average values, and difference values (absolute values) between the start period skewness, kurtosis, and average values and skewness, kurtosis, and average values (final period degradation index values) at the 30th day are calculated. In addition, a change in skewness, a change in kurtosis, and a change in average are taken as new statistical degradation indexes, and degradation index values of the new statistical degradation indexes are ranked together with the start period skewness values of the six statistical degradation indexes and are shown in Table 3.

Table 4 shows that a score of one point is assigned to the cylinders within the top 16% (20 places) in a total of nine ranked final period degradation index values, including the above difference values.

TABLE 3

| Ranking degradation index values | | | | | | |
|---|---|---|---|---|---|---|
| | Cylinder 1 | Cylinder 2 | Cylinder 3 | . . . | Cylinder 129 | Cylinder 130 |
| Skewness | 1 | 100 | 109 | . . . | 2 | 37 |
| Kurtosis | 3 | 70 | 11 | . . . | 20 | 6 |
| Average | 79 | 56 | 10 | . . . | 68 | 84 |
| First quartile | 122 | 3 | 21 | . . . | 51 | 83 |
| Third quartile | 15 | 81 | 9 | . . . | 17 | 125 |
| Variance | 99 | 24 | 27 | . . . | 5 | 27 |
| Change in skewness | 130 | 35 | 31 | . . . | 21 | 4 |
| Change in kurtosis | 6 | 115 | 29 | | 19 | 79 |
| Change in average | 19 | 98 | 20 | . . . | 12 | 8 |

TABLE 4

| Assigning score at upper value | | | | | | |
|---|---|---|---|---|---|---|
| | Cylinder 1 | Cylinder 2 | Cylinder 3 | . . . | Cylinder 129 | Cylinder 130 |
| Skewness | 1 | 0 | 0 | . . . | 1 | 0 |
| Kurtosis | 1 | 0 | 1 | . . . | 1 | 1 |
| Average | 0 | 0 | 1 | . . . | 0 | 0 |
| First quartile | 0 | 1 | 0 | . . . | 0 | 0 |
| Third quartile | 1 | 0 | 1 | . . . | 1 | 0 |
| Variance | 0 | 0 | 0 | . . . | 1 | 0 |
| Change in skewness | 0 | 0 | 0 | . . . | 0 | 1 |
| Change in kurtosis | 1 | 0 | 0 | . . . | 1 | 0 |
| Change in average | 1 | 0 | 1 | . . . | 1 | 1 |

In Table 4, the cylinder for which a sum of the scores is greater than or equal to four points is determined as the failure-predicted cylinder. In this case, the cylinders 1, 3, and 129 are determined as the failure-predicted cylinders. Thus, the above cylinders are likely to fail and need to be checked.

As described above, the data acquisition parts 110 and 210 of the failure prediction systems 100 and 200 of the present invention may each include the data collection device and the database configured to store data. The data acquisition parts 110 and 210 may each include a predetermined statistical program for grouping data by a group. The degradation index value calculation parts 120 and 220 may each include the predetermined computing program to calculate selected statistical degradation indexes or difference values of the statistical degradation indexes. The determination parts 120 and 230 may each include a data reading device, an analysis device, an operation device, and the like for ranking the calculated degradation index values, assigning a predetermined score and obtaining a sum of the predetermined scores, and determining the failure-predicted cylinder. Alternatively, the data acquisition parts 110 and 210, the degradation index value calculation parts 120 and 220, and the determination parts 130 and 230 may each be a computing device implemented by controlling hardware including an operation device such as a central processing part (CPU) and a storage device such as a hard disk with predetermined software, and are configured to be communicable with each other.

Further, the present invention also provides a cylinder failure prediction method using the above-described cylinder failure prediction system, and the like.

Specifically, the method may include acquiring a plurality of pieces of operation time data for each of a plurality of cylinders by repeatedly detecting operation times of the plurality of cylinders over an equipment operation elapsed time, selecting a plurality of statistical degradation indexes that may represent a failure of the cylinder and calculating degradation index values of the selected statistical degradation indexes on the basis of the operation time data, ranking each of the degradation index values according to a magnitude thereof for each cylinder, and assigning a predetermined score to the cylinders having an upper value, which is greater than or equal to a predetermined range, in the ranked degradation index values and determining a failure-predicted cylinder on the basis of a sum of the predetermined scores.

In the acquiring of the plurality of pieces of operation time data, a forward movement time, a backward movement time, or a summed time of the forward and backward movement times of a cylinder rod may be acquired as the operation time data by a sensor or the like installed in the cylinder. At this point, when an inspection target period is composed of a plurality of unit time sections, an individual operation time data group may be acquired by grouping the pieces of operation time data of each cylinder for each unit time section to reduce data throughput.

Thereafter, the plurality of statistical degradation indexes, which may represent the cylinder failure, may be selected on the basis of the operation time data. Examples of such a statistical degradation index may include, for example, an average, a variance, a first quartile, a median, a third quartile, a skewness, and a kurtosis of the pieces of operation time data of each cylinder. When the statistical degradation indexes are selected, a degradation index value of each of the selected statistical degradation indexes is calculated. In this case, when the pieces of operation time data are grouped to be an individual operation time data group as described above, the degradation index values of each cylinder may be calculated for each operation time data group.

Next, the calculated degradation index values are ranked according to the magnitude thereof for each cylinder. Since the degradation index is used, the cylinders having an upper value in the ranked degradation index values are highly likely to be failure-predicted cylinders.

Thereafter, a predetermined score is assigned to the cylinders having an upper value, which is greater than or equal to a predetermined range, in the ranked degradation index values, and the failure-predicted cylinder is determined on the basis of a sum of the predetermined scores.

It is preferable that the degradation index values, which are the basis of determining the failure-predicted cylinder, are calculated on the basis of the pieces of operation time data of a specific time section after the cylinder is repeatedly used for a predetermined period of time. In this case, when the inspection target period is composed of the plurality of unit time sections, a final period degradation index value calculated for the operation time data group of a specific unit time section after the cylinder is operated for predetermined unit time sections of the inspection target period, or an average value of the final period degradation index values for the operation time data groups of each of specific unit time sections may be ranked and used as the basis of determining the failure-predicted cylinder.

Meanwhile, a change value of at least one statistical degradation index selected from among the plurality of statistical degradation indexes may be introduced as an additional statistical degradation index for determining the failure-predicted cylinder. At this point, in order to obtain the change value, a difference value obtained by subtracting the final period degradation index value or the average value of the final period degradation index values from a start period degradation index value calculated for the unit time section of a start period of the inspection target period or a start period operation time data group, or an average value of the start period degradation index values calculated for the start period unit time sections or the start period operation time data groups may be introduced as the change value of the statistical degradation index.

FIG. 13 is a schematic view illustrating a cylinder failure inspection system 1000 according to the present invention.

As shown in the drawing, the cylinder failure inspection system includes the cylinder failure prediction system 100 or 200 of the present invention including the data acquisition part 110 or 210, the degradation index value calculation part 120 or 220, and the determination part 130 or 230, respectively. In addition, an inspection part 300 that is connected to the determination part 130 or 230 of the cylinder failure prediction system 100 or 200 and configured to measure whether air in the cylinder, which is determined as the failure-predicted cylinder by the determination part, is leaking is provided in the cylinder failure inspection system 1000.

The inspection part 300 may be, for example, an ultrasonic/sound camera. The ultrasonic/sound camera is an industrial camera capable of photographing a gas leak and an electric arc in real time by measuring an ultrasonic wave that is inaudible to humans. Ultrasonic energy generated at an air leak point is detected by a sensor array, and this leaked region is displayed with a visible light image of a region to be inspected as a background, so that the leak point may be quickly detected and stored in a Joint Photographic Experts Group (JPEG) image format or a video format of Motion Picture Experts Group audio layer 4 (MP4).

The present invention also provides a cylinder failure inspection method including the cylinder failure prediction method. The inspection method includes inspecting the cylinder that is determined as the failure-predicted cylinder by the cylinder failure prediction method, and replacing the cylinder in which a failure is found by the inspection.

According to the present invention, when only the cylinder determined as the failure-predicted cylinder is inspected by the inspection part, a cylinder checking time is greatly reduced, and thus costs and manpower required for checking the cylinder may be greatly reduced.

MODES OF THE INVENTION

Examples

For a plurality of cylinders used in a tab-welder unit configured to weld between tabs of an electrode assembly of a secondary battery or between the tab and an electrode lead, a failure-predicted cylinder was determined using a cylinder failure prediction system of the present invention. In addition, an actual failure rate of the cylinder was also evaluated.

In Table 5 of Example 1, a determination is performed on a total of 65 cylinders by varying an evaluation date (evaluation order) and results thereof are illustrated. In Table 6 of Example 2, the results of the determination performed by varying the number of cylinders to be inspected and the evaluation date and changing detailed conditions of a failure prediction algorithm of the cylinder failure prediction system (a type of a statistical degradation index, an upper % selection condition, or the like) are illustrated.

Example 1

TABLE 5

| Evaluation order | 1st order | 2nd order | 3rd order | 4th order |
|---|---|---|---|---|
| Total number of inspections (number) | 65 | 65 | 65 | 65 |
| Failure recommendation-rate (%) | 9 (6/65) | 9 (6/65) | 10 (7/65) | 12 (8/65) |
| Actual failed-number | 1 | 1 | 3 | 1 |
| Over-detection rate (%) | 8 (5/65) | 8 (5/65) | 9 (6/65) | 10 (7/65) |
| Uninspected rate (%) | 0 (0/65) | 0 (0/65) | 3 (2/65) | 0 (0/65) |
| Detection rate (%) | 17 (1/6) | 17 (1/6) | 14 (1/7) | 13 (1/8) |

In Table 5, the over-detection rate, the uninspected rate, and the detection rate are represented by equations below, Over-detection rate=over-detected number in failure recommendation-number/total number of inspections Uninspected rate=uninspected number in actual failed-number/total number of inspections Detection rate=actual failed-number/failure recommendation-number As shown in Table 5, it can be seen that the uninspected rate was 0% except for the case of the 3rd order, and the inspection number was also significantly reduced.

Example 2

TABLE 6

| Evaluation order | 5th order | 6th order | 7th order | 8th order | 9th order |
|---|---|---|---|---|---|
| Total number of inspections (number) | 142 | 162 | 162 | 162 | 166 |
| Failure recommendation-rate (%) | 10 (15/142) | 14 (22/162) | 26 (42/162) | 24 (39/162) | 22 (37/166) |
| Actual failed-number | 0 | 3 | 3 | 0 | 3 |
| Over-detection rate (%) | 10 (15/142) | 13 (21/162) | 25 (40/162) | 24 (39/162) | 21 (34/166) |
| Uninspected rate (%) | 0 (0/142) | 1 (2/162) | 1 (1/162) | 0 (0/162) | 0 (0/166) |
| Detection rate (%) | 0 (0/15) | 5 (1/22) | 5 (2/42) | 0 (0/39) | 8 (3/37) |

As shown in Table 6, in the case of the final 9th order, the uninspected rate was 0%, and when only the failure-predicted cylinder parts (37 out of 166) are inspected, the inspection number was reduced by 78%, and thus it can be seen that a cylinder inspection time may be greatly reduced.

The above description is only an example describing the technical spirit of the present invention, and it will be understood by those of skilled in the art that various changes in form and details may be made without departing from the spirit and scope of the present invention. Accordingly, the drawings disclosed herein are considered to be descriptive and not restrictive of the technical spirit of the present invention, and the scope of the technical spirit of the present invention is not limited by these drawings. The scope of the present invention should be construed by the appended claims along with the full range of equivalents to which such claims are entitled.

Meanwhile, even though the terms indicating directions such as upper, lower, left, right, front, and rear directions are used in the present specification, it is obvious to those skilled in the art that these merely represent relative positions for convenience in explanation and may vary based on a position of an observer or an object.

DESCRIPTION OF REFERENCE NUMERALS

10: cylinder
11: cylinder body (housing))
12: cylinder rod
S1 and S2: sensors
100 and 200: cylinder failure prediction systems
110 and 210: data acquisition parts
120 and 220: degradation index value calculation parts
130 and 230: determination parts
300: inspection part
1000: cylinder failure inspection system

The invention claimed is:

1. A cylinder failure prediction system comprising:

a data acquisition part configured to acquire a plurality of pieces of operation time data for each cylinder of a plurality of cylinders by repeatedly detecting operation times of the plurality of cylinders over an equipment operation elapsed time;

a degradation index value calculation part configured to calculate degradation index values of a plurality of statistical degradation indexes capable of representing a failure of each cylinder on the basis of the operation time data; and a determination part configured to:

rank the degradation index values of the statistical degradation indexes calculated for each cylinder according to a magnitude;

assign a predetermined score to cylinders of the plurality of cylinders having an upper value, which is greater than or equal to a predetermined range, in the ranked degradation index values; and determine a failure-predicted cylinder on the basis of a sum of the predetermined scores.

2. The cylinder failure prediction system of claim 1, wherein the data acquisition part is configured to acquire data by taking one or more of a forward movement time, a backward movement time, and a summed time of the forward and backward movement times of a cylinder rod of each cylinder as the operation time of each cylinder.

3. The cylinder failure prediction system of claim 2, wherein the data acquisition part is configured to:

consider each of the forward movement time and the backward movement time of the cylinder rod as one piece of separate and independent operation time data; and acquire two pieces of operation time data corresponding to the forward and backward movement times when the cylinder rod provided in each cylinder performs one reciprocating operation.

4. The cylinder failure prediction system of claim 1, wherein the statistical degradation indexes include two or more selected from a group consisting of an average, a variance, a first quartile, a median, a third quartile, a skewness, and a kurtosis of the pieces of operation time data of each cylinder.

5. The cylinder failure prediction system of claim 1, wherein one or more selected from a group consisting of an average, a variance, a first quartile, a median, a third quartile, a skewness, and a kurtosis of the pieces of operation time data of each cylinder, and a change value of one or more statistical degradation indexes selected from the group are taken as the statistical degradation indexes.

6. The cylinder failure prediction system of claim 1, wherein the degradation index values of the statistical degradation indexes are calculated on the basis of the pieces of operation time data of each cylinder operated during a specific time section after each cylinder is repeatedly used for a predetermined period of time.

7. The cylinder failure prediction system of claim 1, wherein the data acquisition part is configured to:

group the pieces of operation time data of each cylinder for each unit time section of an inspection target period that is composed of a plurality of unit time sections; and take the grouped pieces of operation time data as an individual operation time data group, and wherein the degradation index value calculation part is configured to calculate the degradation index values of each cylinder for each operation time data group.

8. The cylinder failure prediction system of claim 7, wherein the determination part is configured to:

rank final period degradation index values, which are calculated on the basis of the operation time data group of a specific unit time section after the operation is performed for predetermined unit time sections of the inspection target period, for each cylinder;

assign a predetermined score to cylinders of the plurality of cylinders having an upper value, which is greater than or equal to a predetermined range, in the ranked final period degradation index values; and determine the failure-predicted cylinder on the basis of a sum of the predetermined scores.

9. The cylinder failure prediction system of claim 8, wherein a difference value is obtained by subtracting the final period degradation index value from a start period degradation index value for the operation time data group in the unit time section of a start period of the inspection target period or an average value of the start period degradation index values obtained on the basis of the operation time data groups of the unit time sections of the start period thereof, and wherein the difference value is provided as an additional statistical degradation index capable of representing the failure of the cylinder.

10. The cylinder failure prediction system of claim 7, wherein the determination part is configured to:

rank average final period degradation index values obtained by averaging final period degradation index values, which are calculated on the basis of each of operation time data groups of specific unit time sections after the operation is performed for predetermined unit time sections of the inspection target period, for each cylinder; and assign a predetermined score to cylinders of plurality of cylinders having an upper value, which is greater than or equal to a predetermined range, in the ranked average final period degradation index values; and determine the failure-predicted cylinder on the basis of a sum of the predetermined scores.

11. The cylinder failure prediction system of claim 10, wherein a difference value is obtained by subtracting the average final period degradation index values from a start period degradation index value for the operation time data group in the unit time section of a start period of the inspection target period or an average value of the start period degradation index values obtained on the basis of the operation time data groups of the unit time sections of the start period thereof, and wherein the difference value is provided as an additional statistical degradation index capable of representing the failure of the cylinder.

12. A cylinder failure inspection system comprising:

a data acquisition part configured to acquire a plurality of pieces of operation time data for each cylinder of a plurality of cylinders by repeatedly detecting operation times of the plurality of cylinders over an equipment operation elapsed time;

a degradation index value calculation part configured to calculate degradation index values of a plurality of statistical degradation indexes capable of representing a failure of each cylinder on the basis of the operation time data;

a determination part configured to:

rank the degradation index values of the statistical degradation indexes calculated for each cylinder according to a magnitude;

assign a predetermined score to cylinders of the plurality of cylinders having an upper value, which is greater than or equal to a predetermined range, in the ranked degradation index values; and determine a failure-predicted cylinder on the basis of a sum of the predetermined scores; and an inspection part configured to measure an air leak of a cylinder, which is determined as a failure-predicted cylinder by the determination part.

13. A cylinder failure prediction method comprising:

acquiring, by a data acquisition part, a plurality of pieces of operation time data for each cylinder of a plurality of cylinders by repeatedly detecting operation times of the plurality of cylinders over an equipment operation elapsed time;

selecting, by a degradation index value calculation part, a plurality of statistical degradation indexes capable of representing a failure of each cylinder, and calculating degradation index values of the selected statistical degradation indexes on the basis of the operation time data;

ranking, by a determination part, each of the degradation index values for each cylinder according to a magnitude;

assigning, by the determination part, a predetermined score to cylinders of the plurality of cylinders having an upper value, which is greater than or equal to a predetermined range, in the ranked degradation index values, and determining, by the determination part, a failure-predicted cylinder on the basis of a sum of the predetermined scores;

inspecting a cylinder that is determined as a failure-predicted; and replacing the cylinder in which a failure is found by the inspection.

14. The cylinder failure prediction method of claim 13, wherein a change value of at least one statistical degradation index selected from among the plurality of statistical degradation indexes is provided as an additional statistical degradation index for determining the failure-predicted cylinder.

* * * * *